May 4, 1937.  S. T. CASTLEMAN  2,079,396
ELECTRIC CREAM SEPARATOR
Filed March 22, 1933   2 Sheets-Sheet 1
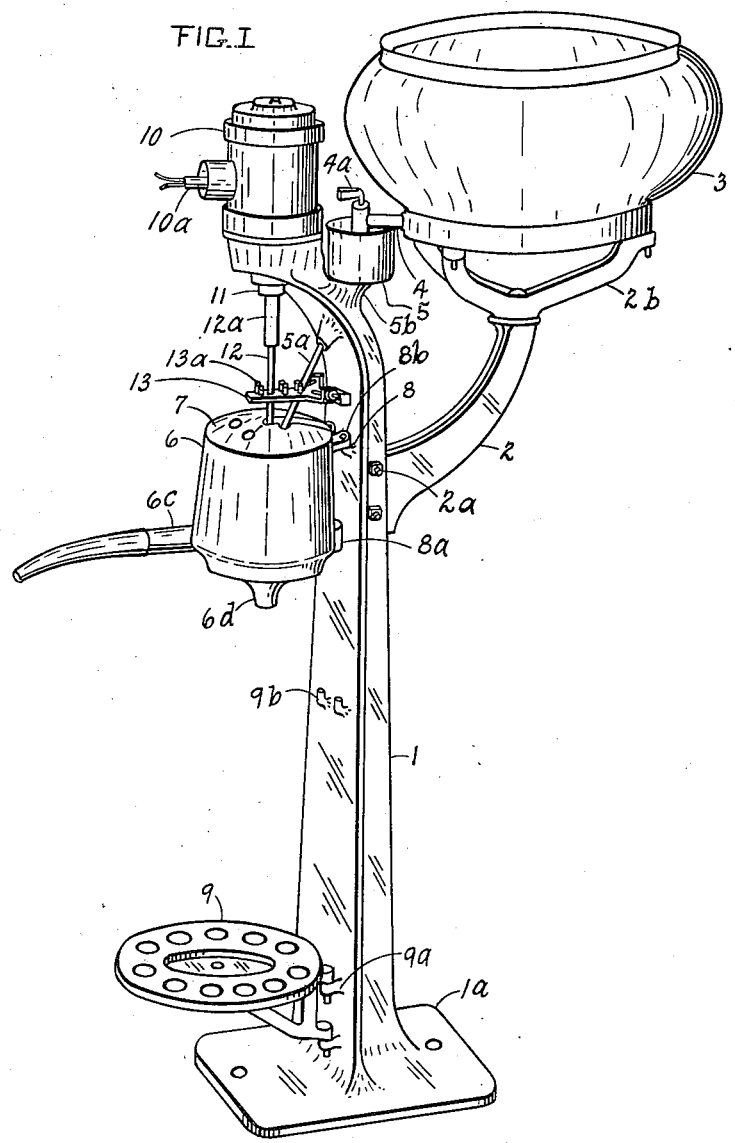
*Samuel T. Castleman* INVENTOR.

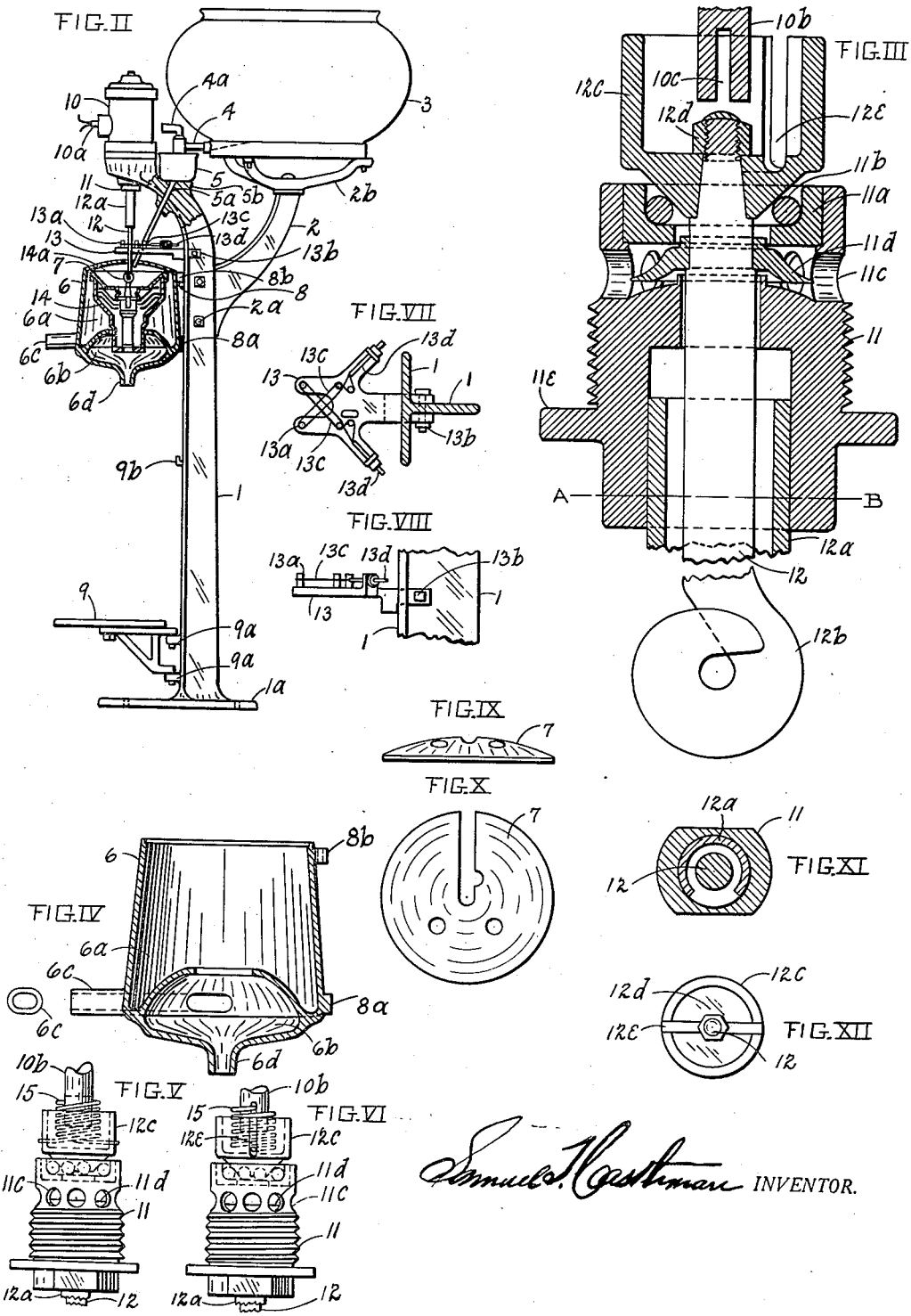

Patented May 4, 1937

2,079,396

UNITED STATES PATENT OFFICE 2,079,396

ELECTRIC CREAM SEPARATOR

Samuel T. Castleman, Louisville, Ky., assignor to All-Electric Cream Separator Company, Louisville, Ky., a corporation of Kentucky Application March 22, 1933, Serial No. 662,019

9 Claims. (Cl. 233—1)

My invention relates to electrically-driven devices adapted for separating the cream from whole milk by means of rotation in which both gravity and centrifugal force are involved. The general purposes of my invention are:—first, to devise an electric cream separator of few parts and compact in form, economical in construction with the vital operative parts adapted for ready inspection; second, to design a power-driven cream separator adapted for convenience in cleaning and assembling and provided with a supply bowl having a gravity-actuated flow therefrom adapted for easy adjustment; the supply bowl being set low enough to readily allow the operator to refill the bowl with ease.

A further specific object of my invention is the provision of a power-driven cream separator of practically noiseless operation, no gearing being used in the mechanism thereof; another special object of this invention has been the designing of novel means for shielding the separator bowl from the seepage of oil from the mechanism thereof. Further objects of my invention will be hereinafter pointed out in my specification and definite claims.

All these objects are attained in my present invention; and my new and useful improvements in electric cream separators is a practical apparatus embodying the aforesaid novel means and other new and useful details of construction, arrangement and combination of parts, all of which, together with their functions, will be described in detail with reference to drawings and will be definitely pointed out in my claims that follow this description.

In this specification, therefore, Figure I is a partial side and front elevation, in perspective, of my electric cream separator, as it appears ready for normal operation, with the cream and the skim-milk receptacles removed.

Figure II is a side projection of my electric cream separator, showing the separator bowl and its duplex collecting casing in section while the other parts are shown in elevation.

Figure III is a lateral projection, partly in elevation and partly in section, of the rotary spindle with its ball-bearing head and of the stationary, threaded housing in which the spindle is suspended. In this view is shown, also, the slotted lower end of the operative motor shaft, the spring coupling to the spindle-head being omitted.

Figure IV is a lateral projection in section, of the duplex collecting casing of the rotary separator bowl which in this view has been removed.

Figures V and VI are side elevations of the threaded, stationary housing of the rotary spindle with a fragment of the spindle visible beneath the housing and the ball-bearing head of the spindle visible above the housing. In these views are shown the relative position of the oil vent holes in the side of the housing and the edge of the oil baffle cone within. In both of these Figures V and VI are shown, also, the lower end of the operative motor shaft in mesh with the flexible torsion-spring connection operatively engaged in the slotted head of the rotary spindle; Figure V showing a side view of the engaging portions of said spring and Figure VI showing an end view of one of said portions in the near side of the head.

Figure VII is a vertical projection in detail of my buffer bracket showing, also, both flexible buffers in their operative positions connected to their adjusting rods.

Figure VIII is a side elevation in detail of my buffer bracket bolted to the upright standard and having the buffers set in the operative positions.

Figure IX is a side elevation of the cover of the collecting casing of the rotary separator bowl.

Figure X is a vertical projection of the top of the cover of the collecting casing of the rotary separator bowl.

Figure XI is a cross section of the rotary spindle, the spindle shield and the stationary housing in which the spindle is suspended, all cut in the plane A B, whose location is shown in Fig. III.

Figure XII is a vertical projection of the upper end of the head of the rotary spindle, showing the slotted bottom and sides adapted for the engagement of the ends of the torsion-spring coupling used in connecting the motor shaft to the spindle-head.

This invention has been designed and developed in its various details for the desirable purpose of producing an efficient electric cream separator,—less expensive to build and more durable in service and less troublesome in operation, upkeep and care than any other cream separator heretofore used or known. With these purposes and the special objects aforesaid, in view, I will now describe my invention in detail, pointing out specifically the new and useful features and explaining the purposes and the operations of the individual parts and the combinations thereof throughout my invention, as illustrated in the drawings hereinabove described, in which similar letters and characters refer to similar parts throughout the several views.

In the design and construction of my new electric cream separator for efficient operation, I have provided an upright standard 1 having a broad integral base 1a. And near the upper end of the standard on the back rib is fastened with the bolts 2a, 2a, the bracket 2 having the branches 2b, 2b, adapted to hold securely the supply bowl 3 into which the whole milk to be separated, may be poured. And from the supply bowl 3 a supply conduit 4 has been prepared, having a valve 4a in the line to control the flow of whole milk to the feed-bowl 5, from which, through the feed conduit 5a, the whole milk flows in a regulated stream down through the lid 7 into the inverted, rotary separator bowl 14, where in normal operation by a combination gravity and centrifugal forces the skim-milk, being heavier than the cream, is forced to the outer edges of the rotating separator bowl 14 and collected in the compartment 6a of the collecting casing 6 from which it is discharged through the skim-milk conduit 6c into any receptacle that may have been placed thereunder. And the cream, being lighter in weight than the milk, gathers around the lower central zone of the rotating separator bowl and falls through the lower end of this rotating bowl into the compartment 6b, from which this cream is discharged through the cream conduit 6d into any receptacle prepared therefor, which should be placed on the bracket 9 and, also, fastened to the lugs 9b, 9b on the face of the standard 1, to prevent the accidental tipping of the receptacle. The bracket 9 is securely fastened to the standard 1 by means of the lugs 9a, 9a.

The rotary separator bowl 14, in its general design and operation, is somewhat similar to the ordinary type of separator bowls, being made up of a central core around which is loosely assembled a plurality of conical discs concave on one side and convex on the other, and provided with central openings for threading the discs on over the central core. These discs are also, provided with the usual perforations and small bosses on their surfaces adapted to keep the discs a little way apart to allow the milk to flow between them through the narrow spaces and, also, to flow from one space to another, in the normal operation of the rotary separator bowl. And centrally disposed at the upper end of the central core of the rotary separator bowl, is fastened a stud carrying, on the outer end thereof, an attachment loop 14a from which the separator bowl may be suspended.

As one of the distinguishing elements of my invention I have devised a novel duplex collecting casing 6 designed to be supported on the lugs 8, 8, on the standard 1 so as to be installed about the rotary separator bowl 14 in a predetermined position relative to the suspended separator bowl; the casing being adapted to collect, in one compartment 6a, the skim-milk to be discharged through the skim-milk conduit 6c into a skim-milk receptacle and to collect in the other compartment 6b the separated cream to be discharged through the cream conduit 6d into a cream receptacle, which should be resting on the bracket 9 and connected to the lugs, 9b, 9b, while the cream separator is in operation.

Now on the upper end of standard 1 is an integral motor-supporting branch upon which is installed in its closed casing the operative universal electric motor 10 which is adapted to operate in this service at approximately 8500 revolutions per minute on either the direct or the alternating current, 25 to 60 cycles; the current being supplied to the motor through the cable 10a which carries two insulated wires. And in the lower end of this motor casing around the motor shaft 10b is a large threaded, axial boring adapted to take the threaded stationary housing 11 of the rotary spindle 12 which, in the assembling of the parts, is screwed into said large, threaded axial boring tightly and locked therein against the locking collar 11e.

Now, the stationary housing 11 of the rotary spindle 12 is equipped with a ball race 11a fitted securely down into a centrally-disposed counterbore in the upper end of the housing and resting on a collar therein. Said housing is, also, provided with oil-vent holes, 11c, 11c, in the sides of said counterbore around the lower end thereof; the bottom of the counterbore being slightly conical and sloping towards said oil-vent holes for the purpose of draining any surplus oil from the ball race therethrough. Through the solid part of the spindle housing 11 there is a centrally-disposed axial boring adapted to allow the free rotation of the spindle therein; and in the lower part of the spindle housing there is a large counterbore adapted to hold securely a cylindrical clip-spring shield 12a designed to surround the rotary spindle as an accessory of safety for the operator, as shown in Figs. I, II, III and XI. And the rotary spindle 12 operative in said housing 11 is equipped with a large cylindrical head 12c locked securely to the upper end of the spindle by means of a threaded nut 12d, which is then made fast by heading over the upper end of said spindle, as shown in Fig. III. The lower part of the large, cylindrical head 12c, is conical in form and adapted to rotate upon a circle of balls 11b, 11b, installed in the ball race 11a.

The spindle 12 is further provided with an oil-baffle cone 11d which is shrunk tightly onto the spindle opposite the oil-vent holes 11c, 11c, and adapted to take any surplus oil from the mechanism above it and, while rotating, to throw the oil out through the oil-vent holes, 11c, 11c, in the sides of the spindle housing. And when I am installing the rotary spindle 12 in the stationary housing 11, I first push the tapered end of said spindle up through the spindle shield 12a and up through the axial boring in the spindle housing and, next, I press the oil-baffle cone 11d tightly on over the spindle and down flush against its supporting collar; the baffle-cone being adapted to rotate with the spindle. I then place the ball-race 11a on over the upper end of the spindle 12 and press the ball race tightly into its socket in the outer end of the central counterbore in the upper end of the spindle housing 11. I now place the balls, 11b, 11b, in the ball-race 11a around the spindle 12 and place the cylindrical spindle-head 12c on the tapered end of the spindle and screw the lock-nut down tightly, allowing the conical lower part of the spindle-head to rest operatively upon the balls, 11b, 11b, in the ball-race 11a, as shown in Fig. III in which the lock-nut 12d and the threaded upper end of the spindle 12 is shown in section and the remainder of the rotary spindle is shown in elevation, but broken near the hook 12b at the lower end of the spindle; the spindle-head being rigidly fixed to the spindle and adapted to rotate therewith.

Now, when the stationary spindle-housing 11 is screwed into the threaded matrix in the lower end of the casing of motor 10 up to the locking collar 11e, the hollow cylindrical spindle-head 12c is elevated around the lower end of the motor shaft 10b nearly to the top of the central slot 10c therein, as shown in Figs. III, V and VI.

In the diametrically opposite sides of the cylindrical spindle-head 12c, I have cut two parallel, longitudinal slots, 12e, 12e, adapted to hold in operative position the two ends of a double-coiled helical torsion spring 15 which I have provided to be used as a flexible coupling between the slotted motor shaft 10b and the rotary spindle-head 12c, as shown in Figs. V and VI.

Now, in connecting the rotary spindle 12 with the motor 10, I first place this helical, torsion spring down over the locknut 12d with one of the ends of the helical spring in each one of the opposite slots, 12e, 12e. Now the middle portion of this double-coiled spring runs straight across the top of the coils diagonally from one side of the coils to the other and is adapted to slide up into the slot 10c as these coacting parts are connected up for operation, as shown in Figs. V and VI, so that when the motor is running, the spindle rotates with it; being directly connected up to the motor shaft 10b through the flexible coupling 15 whose two ends are in operative engagement with the diametrically opposite slots, 12e, 12e, of the spindle-head 12c.

When, therefore, the motor and the rotary spindle and its housing are all connected up, I am ready to hang the rotary separator bowl 14 onto the lower end of the rotary spindle 12. This is done by hooking the twisted hook 12b into the attachment loop 14a on the upper end of the stud fixed in the central core of the separator bowl 14, as shown in Fig. II.

I should, now, install the duplex collecting casing 6 around the rotary separator bowl 14 by pushing the uncovered casing up around the separator bowl far enough to hook the loops, 8b, 8b, of the casing onto the lugs, 8, 8, on the standard 1, allowing the heel 8a of the casing to rest against the flat face of the standard 1. Thus the duplex collecting casing is securely anchored in its predetermined position relative to the rotary separator bowl, so that in normal operation the skim-milk from the separator bowl will be collected in the skim-milk compartment 6a and the separated cream will be collected in the cream compartment 6b, to be discharged into their respective receptacles, as hereinabove explained.

The slotted lid 7 is then fitted upon the collecting casing; the rotary spindle 12 passing through the slot.

Now, a short distance above the casing lid 7, through an opening in the face of the standard 1 and at right angles to the rotary spindle, I have installed a buffer-plate provided with a bifurcated shank adapted with lateral borings to be rigidly fastened by means of the bolt 13b through the back rib of the standard 1, as shown in Figs. II, VII and VIII. And the main part of said buffer-plate I have designed to have four branches; two of which extend out beyond the rotary spindle on either side thereof and are provided with four lugs 13a, 13a, adapted for the installation of two buffer loops of flexible cords, 13c, 13c, crossing each other at right angles and adapted to afford four tangential contacts to the perimeter of the round rotary spindle at points 90 degrees apart; while the other two branches extend back towards the standard 1 at right angles to each other and they are fitted with threaded adjustment rods, 13d, 13d, which, when connected up to the flexible buffer cords, are adapted to be used for adjusting the tension thereof, as shown in Fig. VII.

The feed-cup 5 provided with its feed-conduit 5a, should now be installed in its base-socket 5b on the standard 1 by pushing the feed conduit 5a down through the boring in the bottom of said base-socket and through the oblong hole in the buffer-plate and the notch in the slot of the lid 7 of the collector casing 6, into the separator bowl, where in normal operation the whole milk in this feed conduit 5a is discharged to be separated, as above described. The large supply bowl 3 provided with its supply conduit 4 and the supply-valve 4a extending into the feed-cup 5, should now be set in its operative place on the branches, 2b, 2b, of the bracket 2, ready to be filled with whole milk to be separated.

I am aware of the fact that various attempts have been made heretofore to devise power-driven cream separators to meet certain requirements in this field of endeavor; but none of these seem to be wholly satisfactory to the average farmer and dairy man, under the present stringent conditions of economy and competition. And after finding, upon investigation, the general need for a dependable, quiet-running, durable and economical power-driven cream separator, I have invented and developed this very efficient, gearless device embodying my new and useful improvements in electric cream separators for the general use of farmers and dairymen. And, having thus described the various features of my invention, the detail construction, arrangement and combination of its parts, as well as its functions, those features and combinations of my invention that I consider new and representative of utility, convenience and efficiency, on which I desire Letters Patent granted to me, I have herein set forth and specifically described in the following claims.

In my invention, I claim:—

1. In an electrically-operated cream separator, of the kind hereinabove described, having a strong, light standard with two opposite branching parts near the top thereof, one branching to the front and the other, to the back, said branches being adapted to support in equilibrium all the service parts of said separator: an electric-motor casing enclosing a high-speed electric motor vertically installed on the top of the front branch of said standard, with the driving end of the motor-shaft extending downward; a large, threaded, axial boring through the bottom of said motor-casing below the driving end of said motor-shaft and concentric therewith; an externally-threaded spindle-housing provided with an external lock-collar and adapted to be screwed up into said threaded axial boring and locked therein with said collar; a smooth axial boring through said housing, having counterborings at either end thereof; a ball bearing concentrically installed in the upper end of the upper counterbore; a conical flooring in the bottom of said upper counterbore, sloping to drain outwardly; oil-vent-holes through the sides of said spindle-housing opposite the conical flooring of said upper-counterbore thereof; a rotary spindle concentrically suspended in said housing by means of a detachable cylindrical head designed to rotate on said ball-bearing therein and adapted to carry suspended on its lower end a cream separator bowl operative in a collector casing; a deep counterbore in the upper part of said spindle-head adapted to receive the driving end of said motor-shaft; means installed in said deep counterbore, adapted to connect said driving shaft operatively with said rotary spindle so that the spindle operates with the same speed as the motor shaft; an oil-baffle cone fastened to the rotary spindle adjacent said oil-vent holes and designed, as it rotates in operation, to throw off through said vent-holes any excessive oil from the mechanism above to prevent oil from running down on the spindle to the cream separator bowl suspended on the lower end thereof.

2. An electric cream separator of the character described, comprising, a light-weight metal standard provided with a broad integral base and front and back branching parts near the top thereof, adapted to support in equilibrium all the service parts of the separator; an electric-motor casing vertically installed on the front branch of said standard; a spindle-housing fastened into the bottom of said motor casing; a vertically-disposed rotary spindle suspended from a ball-bearing spindle-head in said housing and having at its lower end securely hooked thereon a cream-separator bowl operative in a collector casing; a high-speed electric motor operatively installed in said motor casing with the driving end of its motor shaft extending downward into said spindle-housing; means for operatively connecting said motor-shaft directly with said rotary spindle to give the rotary spindle in operation the same speed as the motor-shaft; a milk-supply bowl mounted on said back branch of said standard; and means for supplying whole milk in operation from the supply bowl to the cream-separator bowl below.

3. In an electrically-driven cream-separator of the kind described: a light, strong standard having a collecting casing bolted to the side thereof at a predetermined height and provided with a broad base and two branches at the top thereof, adapted to support in equilibrium the other necessary service parts; a milk-supply bowl mounted on one of said branches; a feed-cup and an electric-motor casing with its enclosed electric motor installed on the other branch; a spindle-housing fixed in the bottom of said motor-casing; a rotary spindle operatively installed in said spindle-housing and carrying at its lower end a cream-separator bowl securely hooked thereon and operative in said collecting casing; means for operatively connecting said electric motor directly to said spindle with a cushion-union to give the spindle and its attached separator-bowl the same speed as the energized motor; and a milk-conduit passing from the feed cup through one of said branches, for economy and safety in use, to said cream-separator bowl, as described.

4. In a centrifugal bowl separator, an upright standard having upper forward and rear branches, a milk supply bowl mounted upon the rear branch, a vertical axis motor mounted upon the forward branch, a vertical axis centrifugal bowl separator mounted upon said standard below said motor and having its axis in substantial alinement with said motor axis, and vertical shafting detachably and yieldingly connecting the motor and separator axes.

5. In an electrically driven cream separator, a light, strong standard having a collecting casing bolted to the side thereof at a predetermined height and provided with a broad base and two diametrically opposed branches at the top thereof, adapted to support in equilibrium the other necessary service parts, a milk supply bowl mounted on one of said branches, a feed cup and an electric motor casing with its enclosed electric motor installed on the other branch, a spindle housing fixed in the bottom of said motor casing, a rotary spindle operatively installed in said spindle housing and carrying at its lower end a cream separator bowl securely hooked thereon and operative in said collecting casing, and means for operatively connecting said electric motor directly to said spindle with a cushion-union to give the spindle and its attached separator bowl the same speed as the energized motor.

6. In a centrifugal bowl separator, an upright standard having forwardly and rearwardly supporting branches, a vertical axis motor mounted upon one of said branches, a vertical axis centrifugal bowl separator suitably supported upon a branch below the said motor and having its axis in substantial alinement with said motor axis, vertical shafting detachably and yieldably connecting the motor and the separator axes, and a milk supply bowl suitably supported on the other branch of said standard and communicating with the centrifugal bowl separator.

7. In a centrifugal bowl separator, an upright standard having forward and rear branches, a milk supply bowl mounted upon one of the branches, a vertical axis motor mounted upon another branch, a vertical axis centrifugal bowl separator mounted upon the said standard below said motor and having an axis in substantial alinement with said motor axis, vertical shafting detachably and yieldably connecting the motor and the separator axes.

8. In a centrifugal bowl separator, a standard, a collecting casing bolted to the side of said standard, and provided with a supporting base and forwardly and rearwardly extending branches near the top thereof for supporting in equilibrium service parts of the separator, a milk supply bowl mounted on one of said branches, a vertical axis motor on the other branch thereof, a vertical axis centrifugal bowl separator mounted upon the standard below said motor having its axis in substantial alinement with said motor axis, and a detachable and yieldable connection between the motor axis and the separator bowl axis.

9. In a centrifugal bowl separator, an upright standard having a supporting base and diametrically opposed branches operative to support in equilibrium service parts of the separator, a milk bowl mounted on one of said branches, an electric motor installed on another of said branches, a cream separator bowl supported below the electric motor, means of communication between the milk supply bowl and the said cream separator bowl, the said motor and cream separator bowl having axes in substantial alinement, and a detachable and yieldable connection between the motor axis and the separator bowl axis.

SAMUEL T. CASTLEMAN.